(12) United States Patent
Ishihara et al.

(10) Patent No.: US 7,054,446 B2
(45) Date of Patent: May 30, 2006

(54) CHAOS CRYPTOGRAPHIC COMMUNICATION METHOD AND CHAOS CRYPTOGRAPHIC COMMUNICATION SYSTEM

(75) Inventors: Tetsuya Ishihara, Shizuoka-ken (JP); Takahiro Abe, Shizuoka-ken (JP); Katsufusa Shono, Kanagawa-ken (JP)

(73) Assignee: YAZAKI Corporation, Tokyo (JP)

( * ) Notice: Subject to any disclaimer, the term of this patent is extended or adjusted under 35 U.S.C. 154(b) by 837 days.

(21) Appl. No.: 09/855,798

(22) Filed: May 16, 2001

(65) Prior Publication Data

US 2002/0009200 A1     Jan. 24, 2002

(30) Foreign Application Priority Data

May 17, 2000 (JP) ............... 2000-145274

(51) Int. Cl.
*H04L 9/00* (2006.01)
(52) U.S. Cl. .................... 380/263
(58) Field of Classification Search ........ 380/263, 380/37, 42
See application file for complete search history.

(56) References Cited

U.S. PATENT DOCUMENTS

| 5,193,115 | A | | 3/1993 | Vobach | |
|---|---|---|---|---|---|
| 5,365,589 | A | * | 11/1994 | Gutowitz | 380/263 |
| 5,379,346 | A | * | 1/1995 | Pecora et al. | 380/263 |
| 6,014,445 | A | | 1/2000 | Kohda et al. | |
| 6,792,111 | B1 | * | 9/2004 | Italia et al. | 380/263 |

FOREIGN PATENT DOCUMENTS

| JP | 02-027389 | 1/1990 |
|---|---|---|
| JP | 11-196085 | 7/1999 |

OTHER PUBLICATIONS

Bruce Schneier, "Applied Cryptography", John Wiley & Sons, Inc. , 1994, pp. 174-177.*
M. Gotz et al., "Discrete-Time Chaotic Encryption Systems-Part I: Statistical Design Approach", IEEE, 1997.
Japanese Official Action issued Sep. 20, 2005, in counterpart Japanese application, by Examiner Shigenori Aoki, pp. 1-3, Japan.
Japanese Official Action issued Sep. 20, 2005, in counterpart Japanese application, by Examiner Shigenori Aoki, pp. 1-2, Japan.

* cited by examiner

*Primary Examiner*—Matthew Smithers
*Assistant Examiner*—Courtney Fields
(74) *Attorney, Agent, or Firm*—Finnegan, Henderson, Farabow, Garrett & Dunner, L.L.P.

(57) ABSTRACT

Each of plural CPUs enciphers a plaintext code which is a secrecy object according to chaos block encryption and then enciphers it according to chaos stream encryption. Then, it transmits an obtained cipher code through communication line. On the other hand, each of plural CPUs that received the cipher code synchronously restores the received cipher code according to chaos stream encryption and then restores according to chaos block encryption thereby to obtain an original plaintext code.

6 Claims, 1 Drawing Sheet

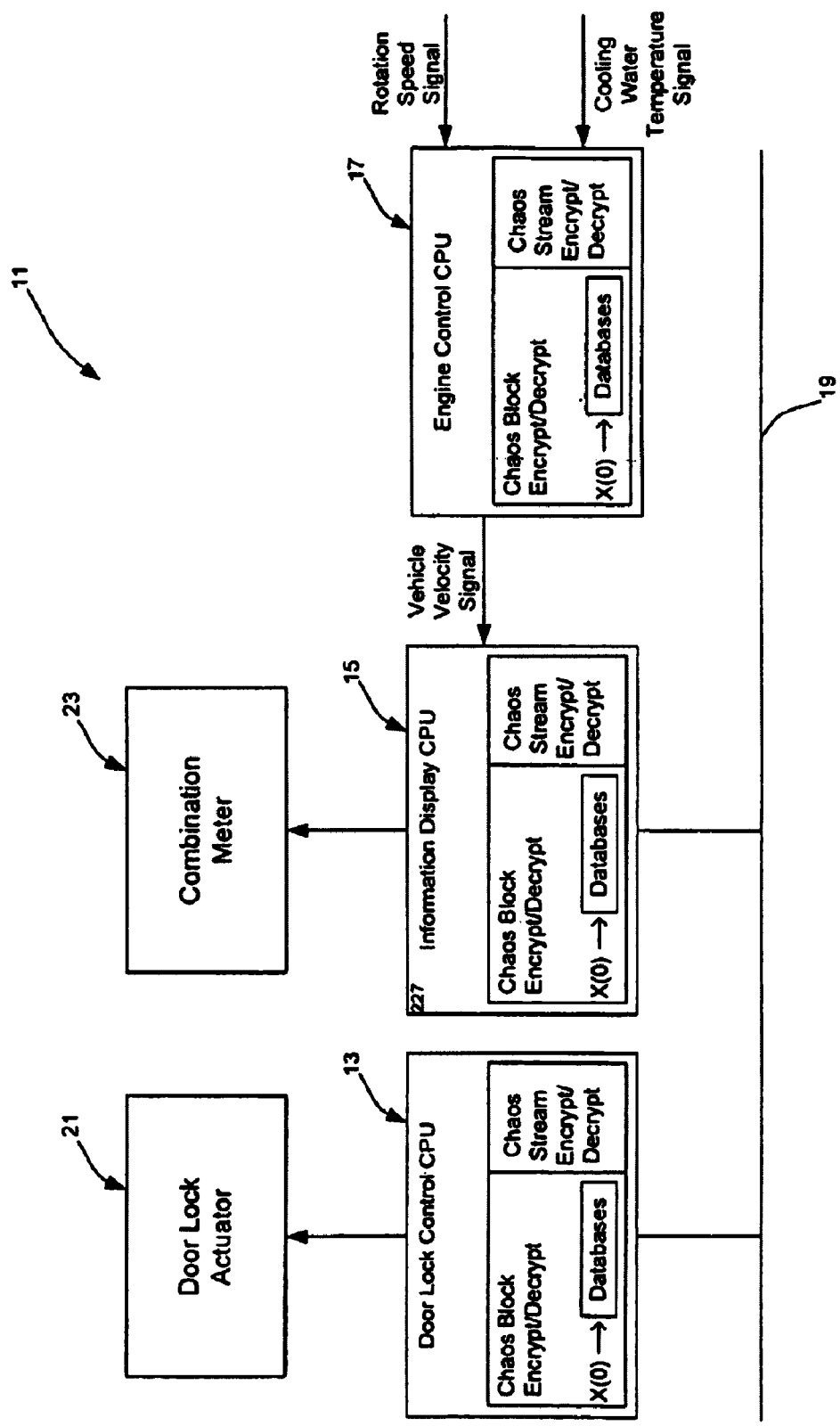

CHAOS CRYPTOGRAPHIC COMMUNICATION METHOD AND CHAOS CRYPTOGRAPHIC COMMUNICATION SYSTEM

CROSS REFERENCE TO RELATED APPLICATION

This application claims benefit of priority under 35 U.S.C. § 119 to Japanese Patent Application No. 2000-145274, filed on May 17, 2000, the entire contents of which are incorporated by reference herein.

BACKGROUND OF THE INVENTION

1. Field of the Invention

The present invention relates to a cryptographic communication method for use in cryptographic communication of information among plural CPUs through communication line and more particularly to a chaos cryptographic communication method and chaos cryptographic communication system capable of achieving robust, highly reliable cryptographic communication which prevents illegal access so as to ensure only legal access.

2. Description of the Related Art

Establishment of social system having robustness and high reliability against every kind of disturbance has been demanded in transportation industries related to, for example, automobile, train, airplane and the like.

To meet such demands, it can be considered to build up a system based on a result of logical operation or linear operation with relatively simple one-to-one correspondence. However, it has been recognized that if the system is built up based on such philosophy, a sufficient reliability cannot be always secured in industry concerning human life. Digital computer mentioned here refers to a machine which executes repetitive jobs faithfully according to a program by logical operation of binary code. Although the digital computer is believed to have a high robustness because it is capable of coping with a large amount of data, basically this is a logical operating machine with one-to-one correspondence. Thus, it is very weak against disturbance. Computer runaway and infection by virus are examples indicating that weakness.

For the reason, it has been demanded strongly to build up a robust, highly reliable and practical system capable of ensuring only a legal access while protecting from illegal access.

SUMMARY OF THE INVENTION

The present invention has been achieved in views of the above described problems and an object of the present invention is to provide a chaos cryptographic communication method and chaos cryptographic communication system capable of robust, highly reliable cryptographic communication which prevents an illegal access and ensures only a legal access.

Prior to description of the present invention, details about arrival at the present invention will be described. Usage of industrial general-purpose CPU in household electric products is basically the same as usage of the CPU in transportation industries such as automobile, train and airplane. It is evident that if the same program and same data base are installed in the same product in common, the same operation is repeated. However, under such usage, it cannot be said that high information processing capacity possessed essentially by the CPU is exerted sufficiently.

Therefore, this inventor paid attention to following functions about an effective usage of the industrial general-purpose CPU which prevents a illegal access and ensures only a legal access. That is, a programmable read only memory (PROM) or electric erasable programmable read only memory (EEPROM) can be mounted on the industrial general-purpose CPU memory. Further, it is possible to change the program depending on the chip. Further, it is possible to change the data base depending on the chip.

The present invention has been achieved from viewpoints of effective use of resource possessed by the industrial general-purpose CPU. Therefore, according to the present invention, there is provided a cryptographic communication method for use in cryptographic communication of information through communication line among plural CPUs wherein cryptographic algorithms containing chaos block encryption and chaos stream encryption are installed in each of the plural CPUs and the plural CPUs carry out cryptographic communication of information by combining the chaos block encryption and the chaos stream encryption.

According to the present invention, cryptographic algorithm containing chaos block encryption and chaos stream encryption are installed in each of the plural CPUs and the plural CPUs carry out cryptographic communication of information by combining the chaos block encryption and the chaos stream encryption. Consequently, the chaos block cipher and chaos stream cipher are generated according to chaos measured by nonlinear quantization so as to achieve linearization.

According to the present invention, the cryptographic algorithm composed of combination of the chaos block encryption and chaos stream encryption are installed in each of the plural CPUs and by carrying out cryptographic communication of information using such cryptographic algorithm, chaos cryptographic communication method capable of achieving a robust, highly reliable cryptographic communication can be provided.

Further, there is provided a cryptographic communication system constructed by connecting plural CPUs through communication line for carrying out cryptographic communication among the CPUs, wherein the plural CPUs, after enciphering a plaintext code which is a secrecy object by chaos block encryption, encipher by chaos stream encryption and transmits an obtained cipher code, and after synchronously restoring a received cipher code by the chaos stream encryption, restore by the chaos block encryption so as to obtain an original plaintext code.

According to the present invention, plural CPUs, after enciphering plaintext code which is a secrecy object by chaos block encryption, encipher by chaos stream encryption and transmits an obtained cipher code, and after synchronously restoring a received cipher code by the chaos stream encryption, restore it by the chaos block encryption so as to obtain an original plaintext code.

Further, there is provided a cryptographic communication system constructed by connecting plural CPUs through communication line for carrying out cryptographic communication among the CPUs, wherein the plural CPUs, after enciphering a plaintext code which is a secrecy object by chaos block encryption, encipher by chaos stream encryption and transmits an obtained cipher code, and after synchronously restoring a received cipher code by the chaos stream encryption, verify a block cipher key and after it is certified that it is a legal access, restore by the chaos block encryption so as to obtain an original plaintext code.

According to the present invention, the plural CPUs, after enciphering plaintext code which is a secrecy object by chaos block encryption, encipher it by chaos stream encryption and transmits an obtained cipher code, and after synchronously restoring a received cipher code by the chaos stream encryption, verify a block cipher key and after it is certified that it is a legal access, restore it by the chaos block encryption so as to obtain an original plaintext code.

In the chaos block encryption, the plaintext code is divided to block units of, for example, 4 bits and each divided block unit is enciphered or restored according to prepared cipher key, cipher table and restoration table. The cipher key in the chaos block encryption is an integer string which is generated by using random-number and provides each block unit with order. The cipher table is preceding time series of chaos measured by nonlinear quantization. The restoration table is a correspondence table obtained by rearrangement of the cipher table. The feature of the chaos block encryption is that a number of the cipher keys can be issued by permutations and combinations and by verifying the cipher key prior to restoration of the cipher key, only legal access can be ensured. The transmission data are the cipher key and cipher code. The transmission data are subjected preliminarily to basic operation intended to keep secrete information such as transposition, substitution, inversion and the like in order to prevent which is the cipher key and which is the cipher code of the transmission data from being known easily.

For chaos stream encryption, a chaos code string cut out from chaos time series is used as pseudo noise (PN) signal for a synchronous multiplex communication. The same PN signal group is installed in each CPU intended to transmit and receive and the CPUs carry out transmission and reception in synchronism with each other. Transmission and reception between the CPUs without synchronism are regarded as noise by each other. In the chaos stream encryption, the cipher code is generated by an exclusive-OR (EXOR) operation on the plaintext code which is the transmission data and PN signal. At this time, it is preferable to diffuse the signal. If the exclusive-OR operation is carried out with the PN signal after diffusion, a diffused portion is compressed after restoration in which an EXOR operation with the PN signal is carried out again, thereby to restore to the original plaintext code. A code error in transmission can be verified in this process. For example, in cryptographic communication system under environment having much noise like vehicle, it is very important to employ a system automatically including error verification.

The cipher table, restoration table, cipher key and PN signal are installed in the CPU of this system. The cipher table and restoration table may be given to the system in common. Although the same data base needs to be installed in a pair of CPUs which transmit and receive the cipher key, PN signal and cipher code, a different data base may be installed in each CPU performing a different job.

Principally, this system is common key type cryptographic communication system in which a single communication line is shared so that a synchronous multiplex communication is carried out among plural CPUs.

Because, according to the present invention, encryption and restoration processing are carried out using cryptographic algorithm composed of combination of the chaos block encryption and chaos stream encryption, it is possible to build up a chaos cryptographic communication system capable of realizing robust, highly reliable cryptographic communication which prevents an illegal access and ensures only a legal access. If, for example, the PN signal is stolen when only the chaos stream encryption is used, an original text may be restored only by sliding the phases of the cipher code and PN signal with respect to each other. However, in case of encryption and restoration processing using the cryptographic algorithm composed of combination of the chaos block encryption and chaos stream encryption, even if such an event happens, the original text may not be restored easily.

Further, because according to the present invention, the cipher key is verified prior to restoration of the cipher code, it is possible to build up chaos cryptographic communication system capable of achieving robust, highly reliable cryptographic communication which prevents an illegal access and ensures only a legal access.

As described above, mechanical system which prevents an illegal access and ensures only a legal access has been strongly demanded in social system requiring secrecy, justice and fairness strictly.

As a device for meeting such demands, conventionally, certification system using, for example, electronic key, magnetic card or IC card has been introduced. However, management of the social system which requires prevention of the illegal access is often committed to man. In this case, an illegal access by man who should strictly manage it is likely to do harm undesirably to the safety of the social system. Particularly, because cipher system is only a settlement by man, human intention always concerns generation of the cipher key, cipher table and restoration table. Accordingly, there is a room where illegality by man may invade thereinto.

From such a viewpoint, according to the present invention, a method for controlling information about the cipher key, cipher table and restoration table, which take an important role in chaos block encryption, unitarily with minimum starting information such as binary decimal data of, for example, 52 bits has been proposed.

That is, according to a preferred embodiment of the present invention, respective data bases for a cipher key, a cipher table and a restoration table in the chaos block encryption is controlled unitarily by providing with an appropriate initial value x(0).

The chaos includes every combination in its time series $\{y(t)-t\}$. The time series of the chaos obtained by isomorphic conversion and quantization include every combination of integers corresponding to its resolution. The chaos block encryption intends to design a cipher table using degeneration of quantum and branch to the past. The restoration table for use in restoration of the cipher code to an original plaintext code is produced according to the cipher table.

A correspondence between a box of degenerated quantum and divided block is defined with the permutation of integers so as to produce the cipher key. The cipher key and cipher table, which are composition elements for chaos block encryption, are originally different from each other. However, according to the above described embodiments, they are not handled as different from each other, but produced and controlled unitarily from a common initial value x(0).

According to this embodiment, it is possible to reduce the quantity of system information which should be controlled including the cipher key, cipher table and restoration table, which take an important role in chaos block encryption. Further, it is also possible to contribute to establishment of social system in which man is not accused of responsibility of control thereof by reducing an opportunity in which man may concern illegality.

The nature, principle and utility of the invention will become more apparent from the following detailed description when read in conjunction with the accompanying drawing.

BRIEF DESCRIPTION OF THE DRAWING

In the accompanying drawing:

FIG. 1 is a diagram showing an example of application of the chaos cryptographic communication system of the present invention upon on-board communication system constructed so as to be capable of exchanging data among CPUs mounted on a vehicle.

DESCRIPTION OF THE PREFERRED EMBODIMENTS

Hereinafter, the preferred embodiments of the chaos cryptographic communication method and chaos cryptographic communication system of the present invention will be described in detail with reference to the accompanying drawing.

FIG. 1 shows an example of application of the chaos cryptographic communication system of the present invention upon on-vehicle communication system constructed so as to be capable of exchanging data among CPUs mounted on a vehicle.

As shown in FIG. 1, the on-board communication system 11 which constructs the chaos cryptographic communication system of the present invention comprises a door lock control CPU 13 installed inside, for example, door lining, an information display CPU 15 installed inside, for example, combination meter assembly, an engine control CPU 17 installed below, for example, driver's seat, a communication line 19 for connecting these CPUs 13, 15 and 17 so as to enable exchange of data, a door lock actuator 21, and a combination meter 23. The CPUs 13, 15, 17 may be of, for example, 8-bit computer. The communication line 19 may employ an appropriate style of communication line depending on data transmission system for use, for example, a communication line is used for bit serial data transmission while bundled communication lines are used for bit parallel data transmission.

A vehicle velocity sensor (not shown) for measuring a traveling speed of a vehicle is connected to the information display CPU 15 and further, an engine rotation speed sensor (not shown) for measuring a rotation speed of the engine and a cooling water temperature sensor (not shown) for measuring an engine cooling water temperature are connected to the engine control CPU 17. Before signals from various sensors are fetched to each CPU as input signal, an analog signal from each sensor is converted to digital signal. This AD conversion does not have to be linear. A signal of a kind which does not require strict linearity, for example, a signal for engine cooling water temperature, is desired to be subjected to AD conversion weighted with non-linearity considering its importance. Consequently, not only the amount of information to be handled can be reduced so as to reduce a load on the CPU, but also the system can be restructured by modifying its related technology reasonably.

To control drive of external actuators (door lock actuator 2121, combination meter 23) connected to the CPUs 13, 15, analog signal obtained by carrying out DA conversion is used. The digital signal may be used for ON/OFF control for the switch. If not linear control but multi-stage setting control is carried out, the multi-stage control of from 16 stages up to 256 stages can be achieved by 4-bit or 8-bit digital signal. The DA conversion does not have to be linear. The DA conversion weighted depending on the importance of the control signal is often effective. Whether the AD conversion on the sensor side is non-linear or the DA conversion on the actuator side is non-linear may be selected appropriately depending on the necessity. Although it can be considered to make both of them non-linear, that choice is not absolutely necessary.

Next, an operation of the on-board communication system 11 which constructs the chaos cryptographic communication system of the present invention having such a structure will be described.

In the engine control CPU 17, plaintext code including the rotation speed signal and cooling water temperature signal inputted from various sensors is enciphered with complex cryptographic algorithm composed of combination of block encryption and stream encryption. The cipher code obtained by this encryption is sent through the communication line 19 following a promised timing. The cipher code is captured synchronously by the information display CPU 15 and restored to information about rotation speed signal and cooling water temperature signal of plaintext through an opposite process to encryption and then, the restored information is sent to the combination meter 23. At this time, the door lock control CPU 13 does not capture synchronously the cipher code sent from the CPU 17. The reason is that the cipher code including the rotation speed signal and cooling water temperature signal sent from the CPU 17 is just noise as viewed from the CPU 13.

While information of vehicle velocity inputted from a vehicle velocity sensor is sent to the combination meter 23, plaintext code including that information is enciphered with complex cryptographic algorithm composed of combination of the block encryption and stream encryption in the information display CPU 15. A cipher code obtained by the encryption is sent through the communication line 19 following a promised timing. That cipher code is captured synchronously by the door lock control CPU 13 and restored to information about the vehicle velocity signal of plaintext code through an opposite process to the encryption. Correspondingly, the door lock control CPU 13 transmits a door lock signal to the door lock actuator 21 together with the restored information about the vehicle velocity. After receiving this signal, the door lock actuator 21 is actuated so as to maintain door-locked state. At this time, the engine control CPU 17 does not capture synchronously the cipher code sent from the CPU 15. The reason is that the cipher code including information about the vehicle velocity sent from the CPU 15 is just noise.

The control signals fetched into the respective CPUs 13, 15, 17 are received according to a program or algorithm installed in the CPU, subjected to enciphering and multiplexing processing and then transmitted to the communication line 19. At this time, transmission and reception of signals by making use of synchronous capturing of chaos stream encryption. That is, plural on-board CPUs are controlled by time-division multiplexing digital communication.

According to the present invention, encryption with the chaos block cryptographic algorithm is employed to improve robustness of the system. Encryption with the chaos block encryption requires a cipher key generated with chaos code string. If the system is so constructed as to verify this cipher key prior to restoration of a cipher code, double check together with synchronous capturing of the stream encryption can be achieved.

The chaos encryption achieves a high processing speed of MB/s order in stream encryption as well as block encryption. Therefore, this can be said to be a sufficient processing speed for information processing on vehicle. Communication through the CPU is not restricted to application to vehicle, but has been a basic technology for supporting today's industry. The system needs to be so constructed not to be affected badly by erroneous signal processing as well as noise. The present invention is a trunk technology necessary for such a case.

According to the present invention, in case of vehicles, different signals are used depending on each vehicle. For example, a signal for controlling ignition timing of an engine occupies an important position as technology for controlling a traveling condition of the vehicle. According to the present invention, such an important signal is made completely secrete with chaos cryptographic algorithm composed of combination of the block encryption and stream encryption. Thus, even if a third party happens to steal that signal, the signal is never deciphered, so that a robust, highly reliable cryptographic communication can be achieved preventing an illegal access and ensuring only a legal access.

The present invention, which introduces chaos cryptographic algorithm to plural CPUs, makes use of affinity with the cipher possessed by chaos technology which can be applied to system constructed by combination of the block encryption and stream encryption thereby providing the system with double check function contributing to improvement of the robustness.

As one of means for obtaining a chaos code string which is a basis for the cipher key, cipher table and restoration table in the chaos block encryption, a following example can be mentioned. That is, there are Logistic map: $x(t+1)=4x(t)\{1-x(t)\}$,
Feedback: $x(t)=x(t+1)$, and
Isomorphic conversion and quantization:

$$y(t)=[\{2/\pi \cdot arc\ sin\ \sqrt{x(t)}\} \cdot 2^n]$$

(where t is discrete-time, x(t) is internal condition of chaos presented with a double-precision real number normalized between 0 and 1, and [] means a processing for rounding down the fractional portion), the logistic map being symmetrical nonlinear mapping function under 52 bits in mantissa in digital computer. Calculation for obtaining the isomorphic conversion and quantization: $y(t)=[\{2/\pi \cdot ar\ sin\ \sqrt{x(t)}\} \cdot 2^n]$ is one of the means for obtaining time series $\{y(t)-t\}$ of chaos. When n=8, chaotic arrangement time series of integers of 0–255 is presented. An initial value x(0) for calculation is given with a minimum starting information (binary decimal data of 52 bits).

There is a relation of orderly branch between y(t) and y(t−τ) which precedes by τ steps on this time series, so that degeneration of $2^\tau$ occurs. A value y(t−τ) belonging to each degenerated quantum box is obtained by retrieving the time series so as to produce a cipher table. Unless the order of time t is exchanged, initial value sensitivity is left in the cipher table.

The cipher key is correspondence between a divided digital block and the degenerated quantum box in the cipher table. This is expressed with the permutation of 0, 1, 2, . . . ($2^\tau$−1). If τ=4, it means the permutations of integers 0 to 15, so that the kinds thereof are 16!.

Although the permutation of the cipher keys 0, 1, 2, . . . ($2^\tau$−1) may be generated according to a conventionally well known pseudo-random number generation method, it may be obtained from time series of chaos. If it is intended to obtain the cipher key from the chaos time series, it can be reproduced repeatedly from any initial value x(0) which is 52-bit binary decimal data. By using a single initial value x(0) for production of the cipher key, cipher table and restoration table in common, the cipher key, cipher table and restoration table, which take important roles in chaos block encryption, can be controlled unitarily.

An infinite number of algorithms for obtaining the permutation of the cipher keys 0, 1, 2, . . . , ($2^\tau$−1) from the chaos time series can be considered. For example, by generating binary code pseudo-random number with resolution of isomorphic conversion and quantization n=1 and then bundling every τ bits, it is possible to obtain a permutation of 0 to ($2^\tau$−1). Further, it is also possible to obtain a permutation of 0 to ($2^\tau$−1) with resolution of isomorphic conversion and quantization n=τ.

More specifically, an example in which quantization resolution n is 8 and step τ for returning to a preceding step is 4 is a practically easy embodiment. Word processor plaintext document is described with ASCII code so that each character is processed with eight bits (1 byte) as a unit. τ=4 means 4-bit block, executing quickly restoration processing for chaos block encryption (for example, 10 MB/s) without generating any fraction number.

Quantization resolution n=8 means that 4-bit block plaintext code is converted to 8-bit cipher code. Therefore, the plaintext file is scrambled to be expanded twofold so as to be a cipher code file. In case of binary distribution in a plaintext file, 8-bit notation has a bias particular to ASCII code that the head bit is always "0". On the other hand, a cipher code file is binary-distributed without bias particular to chaos. Thus, it is impossible to estimate a plaintext file based on the cipher code file.

If it is intended to calculate time series y(t)-t from any initial value x(0) which is 52-bit binary decimal data when quantization resolution n is 8 and step τ for returning to a preceding step is 4, the length of the time series $t_{max}=2^{16}=65,536$ is appropriate. 4,096 8-bit codes on average are allocated to 16 degenerated quantum boxes, so that they are provided as cipher code successively.

Binary codes (pseudo random-number string) are generated up to $t_{max}=2^{16}=65,536$ from a single initial value x(0) with n=1 and divided every 4 bits, so that the permutations of 0 to 15 are generated as the cipher key. The number is 1200. If a cipher key is obtained by combining permutations picked up arbitrarily from those, the total number of the combinations is 1,440,000. Meanwhile, the cipher may be constructed hierarchically using this combination.

52-bit binary decimal number is a unit which today's digital computer is capable of computing. According to the present invention, with the 52-bit binary decimal number as initial value x(0), all data base necessary for embodiment of the chaos block encryption can be controlled unitarily.

Because according to the present invention, all the data base necessary for embodiment of the chaos block encryption is controlled with a single initial value as starting point, the present invention contributes largely to establishment of fair, safety social system which does not burden man with responsibility by reducing a room concerned by man as much as possible.

In the meantime, the above described embodiments are description of examples to facilitate understanding of the present invention, not to restrict the technical scope of the present invention. That is, the present invention includes not only all embodiments belonging to the technical range but also all equivalents.

Although, in the above described embodiments, as shown in FIG. 1, a case where plural CPUs are connected through communication line has been described, the present invention is not restricted to this example and includes a case where plural CPUs are mutually connected through radio medium such as infrared ray. Radio wave is irradiated in every direction and naturally received by other CPU than a target CPU. It is needless to say that the synchronous capturing with the stream encryption is particularly effective in such a case also.

More generally, it should be understood that many modifications and adaptations of the invention will become apparent to those skilled in the art and it is intended to encompass such obvious modifications and changes in the scope of the claims appended hereto.

What is claimed is:

1. A cryptographic communication method for use in cryptographic communication of information through communication lines among plural CPUs, the method comprising:
    installing cryptographic algorithms containing a combination of chaos block encryption and chaos stream encryption in each of said plural CPUs;
    deriving a cipher key, for carrying out cryptographic communication of information, from a data base; and
    carrying out said cryptographic communication of information by applying said combination of chaos block encryption and said chaos stream encryption to the information.

2. A cryptographic communication system constructed by connecting plural CPUs through communication lines for carrying out cryptographic communication among the CPUs, wherein
    said plural CPUs, after enciphering a plaintext code which is a secrecy object by chaos block encryption, encipher by chaos stream encryption and transmit an obtained cipher code, and
    after synchronously restoring a received cipher code by said chaos stream encryption, restore by said chaos block encryption so as to obtain an original plaintext code.

3. A cryptographic communication system constructed by connecting plural CPUs through communication lines for carrying out cryptographic communication among the CPUs, wherein
    said plural CPUs, after enciphering a plaintext code which is a secrecy object by chaos block encryption, encipher by chaos stream encryption and transmit an obtained cipher code, and
    after synchronously restoring a received cipher code by said chaos stream encryption, verify a block cipher key and after it is certified that it is a legal access, restore by said chaos block encryption so as to obtain an original plaintext code.

4. A chaos cryptographic communication method as claimed in claim 1 wherein respective data bases for said cipher key, a cipher table and a restoration table in said chaos block encryption are controlled unitarily by providing with an appropriate initial value $x(0)$.

5. A chaos cryptographic communication system as claimed in claim 2 wherein respective data bases for a cipher key, a cipher table and a restoration table in said chaos block encryption are controlled unitarily by providing with an appropriate initial value $x(0)$.

6. A chaos cryptographic communication system as claimed in claim 3 wherein respective data bases for a cipher key, a cipher table and a restoration table in said chaos block encryption are controlled unitarily by providing with an appropriate initial value $x(0)$.

* * * * *